US012337592B2

(12) United States Patent
Beck et al.

(10) Patent No.: US 12,337,592 B2
(45) Date of Patent: Jun. 24, 2025

(54) CUTTER INTEGRATED WITH TAMPING MECHANISM FOR ENHANCED LINERLESS PROCESSING

(71) Applicant: ZEBRA TECHNOLOGIES CORPORATION, Lincolnshire, IL (US)

(72) Inventors: David F Beck, Exeter, RI (US); Richard J. Preliasco, North Kingstown, RI (US)

(73) Assignee: Zebra Technologies Corporation, Lincolnshire, IL (US)

( * ) Notice: Subject to any disclaimer, the term of this patent is extended or adjusted under 35 U.S.C. 154(b) by 280 days.

(21) Appl. No.: 18/073,696

(22) Filed: Dec. 2, 2022

(65) Prior Publication Data

US 2024/0181791 A1 Jun. 6, 2024

(51) Int. Cl.

| | |
|---|---|
| ***B41J 11/70*** | (2006.01) |
| ***B41J 3/407*** | (2006.01) |
| ***B41J 15/04*** | (2006.01) |

(52) U.S. Cl.

CPC ............ *B41J 11/70* (2013.01); *B41J 3/4075* (2013.01); *B41J 15/04* (2013.01)

(58) Field of Classification Search

CPC ........... B41J 11/70; B41J 3/4075; B41J 15/04

See application file for complete search history.

(56) References Cited

U.S. PATENT DOCUMENTS

| | | | | |
|---|---|---|---|---|
| 2017/0297352 | A1* | 10/2017 | Porat | B41J 11/70 |
| 2020/0399086 | A1* | 12/2020 | Aprato | B65H 21/02 |

* cited by examiner

*Primary Examiner* — Scott A Richmond

(57) ABSTRACT

Disclosed is a label application device for applying a label to an object. The label application device comprises a media roll holder configured to secure a media roll, a tamp arm configured to move from a retracted position to an extended position, and a print head located between the media roll holder and the tamp arm. The print head is configured to receive the media roll, feed the media roll into the print head, and eject the media roll. The tamp arm comprises a tamp pad attached to an end of the tamp arm. The tamp pad comprises a vacuum port configured to suction the media roll against the tamp pad. The tamp arm further comprises a blade attached to the tamp arm. The blade is configured to cut the media roll as the tamp arm moves from the retracted position to the extended position.

11 Claims, 16 Drawing Sheets

CUTTER INTEGRATED WITH TAMPING MECHANISM FOR ENHANCED LINERLESS PROCESSING

BACKGROUND

The present disclosure relates to labeling packages for shipping, labeling produce, etc. The labels can be manually applied by hand, applied with a handheld label applicator, or applied by automated labeling systems such as printer systems using linerless labels.

BRIEF DESCRIPTION OF THE SEVERAL VIEWS OF THE DRAWINGS

The novel features of the various aspects are set forth with particularity in the appended claims. Throughout the FIGS. like reference characters designate like or corresponding parts throughout the several views of the drawings. The described aspects, however, both as to organization and methods of operation, may be best understood by reference to the following description, taken in conjunction with the accompanying drawings in which:

Figure 1:
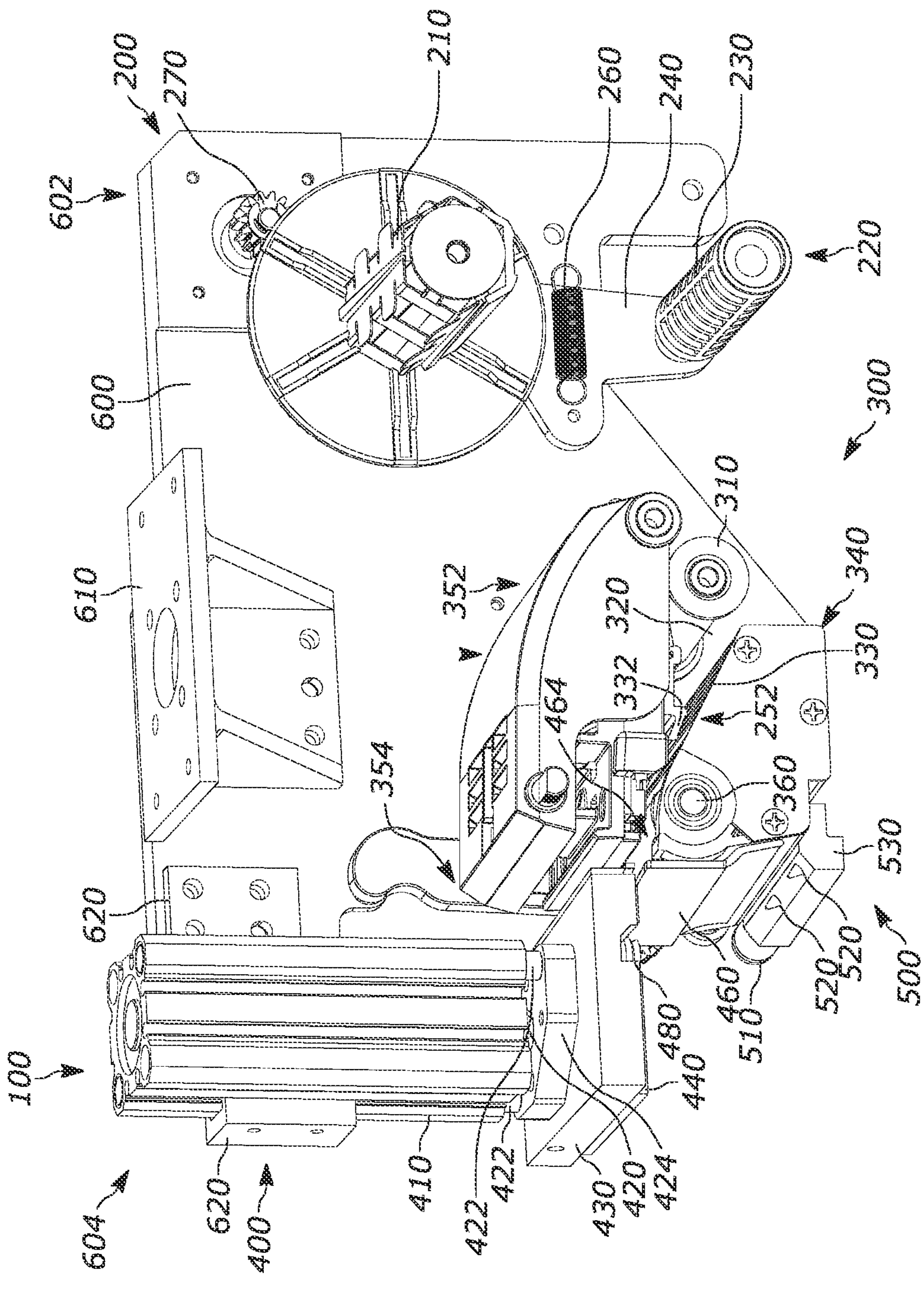
FIG. 1 is a perspective view of a label application device, according to at least one aspect of the present disclosure.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The following detailed description of example implementations refers to the accompanying drawings. The same reference numbers in different drawings may identify the same or similar elements.

In automated labelling systems, a label can be applied to an object or item (e.g., an object or item that is to be stored, tracked, and/or transported) via a robotic device. For example, a label application device can apply a label to an object that is moved on a conveyor. A standard automated label application device has a media supply mechanism, a printing mechanism, a cutting mechanism, and an applicator system. Due to the complexity of the design it can be difficult for a user to load a media roll into the system. For example, a linerless media roll can be sticky making it hard for a user to move the media web through the label application device. Additionally, the label application device has to perform multiple tasks to apply a label to an object. For example, the label application device has to control its different components to print a label on a media roll, cut the printed label from the media roll, and then apply the printed label to an object. There can be issues if any of these systems do not perform properly.

To alleviate potential issues due to the complex design, the system can be simplified by removing the cutting mechanism and combining it with the applicator system. For example, a cutter can be combined with the applicator system such that a printed label is cut as the applicator system moves to apply the printed label to an object. This combines the cutting motion and an applicator system motion into one common motion that cuts and applies the printed label to an object.

Examples disclosed herein are directed to a label application device for applying a label to an object. The label application device comprises a media roll holder configured to secure a media roll, a tamp arm configured to move from a retracted position to an extended position, and a print head located between the media roll holder and the tamp arm. The print head is configured to receive the media roll on an upstream end of the print head, feed the media roll into the print head, and eject the media roll out of a downstream end of the print head. The tamp arm comprises a tamp pad attached to an end of the tamp arm. The tamp pad comprises a vacuum port on a surface of the tamp pad, wherein the vacuum port is configured to suction the media roll against the surface of the tamp pad. The tamp arm further comprises a blade attached to an upstream side of the tamp arm. The blade is configured to cut the media roll as the tamp arm moves from the retracted position to the extended position.

Additional examples disclosed herein are directed to a method of applying a label to an object. The method comprising providing a label application device. The label application device comprising a media roll holder configured to secure a media roll, a tamp arm configured to move from a retracted position to an extended position, and a print head located between the media roll holder and the tamp arm. The print head is configured to receive the media roll on an upstream end of the print head, feed the media roll into the print head, and eject the media roll out of a downstream end of the print head. The tamp arm comprises a tamp pad attached to an end of the tamp arm. The tamp pad comprises a vacuum port on a surface of the tamp pad, wherein the vacuum port is configured to suction the media roll against the surface of the tamp pad. The tamp arm further comprises a blade attached to an upstream side of the tamp arm. The method further comprises placing the label application device in a position to apply the label to the object, receiving label data, and printing the label on the media roll based on the label data. The method further comprises ejecting the label on the media roll out of the downstream end of the print head, coupling the label to the tamp pad, and moving the tamp arm from the retracted position to the extended position. The blade is configured to cut the media roll as the tamp arm moves from the retracted position to the extended position. The method further comprises applying the label to the object.

Additional examples disclosed herein are directed to a label application device for applying a label to an object. The label application device comprising a media supply system, an applicator system configured to move from a retracted position to an extended position, and a print mechanism located between the media supply system and the applicator system. The print mechanism is configured to receive media on an upstream end of the print mechanism and eject the media out of a downstream end of the print mechanism. The applicator system comprises a blade attached to an upstream side of the applicator system, wherein the blade is configured to cut the media as the applicator system moves from the retracted position to the extended position.

Removing the cutting mechanism and combining the cutting motion with the application system provides multiple benefits. The label application device has one less motor to control, which makes the system easier to control with less parts. The label application device becomes easier to assembly since there are less parts and mechanisms. The cutting mechanism generally surrounds a portion of the media roll, which can make it hard to load a media roll into the mechanism. Removing the cutting mechanism allows the media roll path on the label application device to be more open, which makes it easier to load a media roll. Since the label application device is more open it becomes easier to clean the device and access the different components for cleaning. The blade can also be moved to a location, where it is easier to access. This new location on the applicator system makes the blade easier to clean and/or replace.

Figure 2:
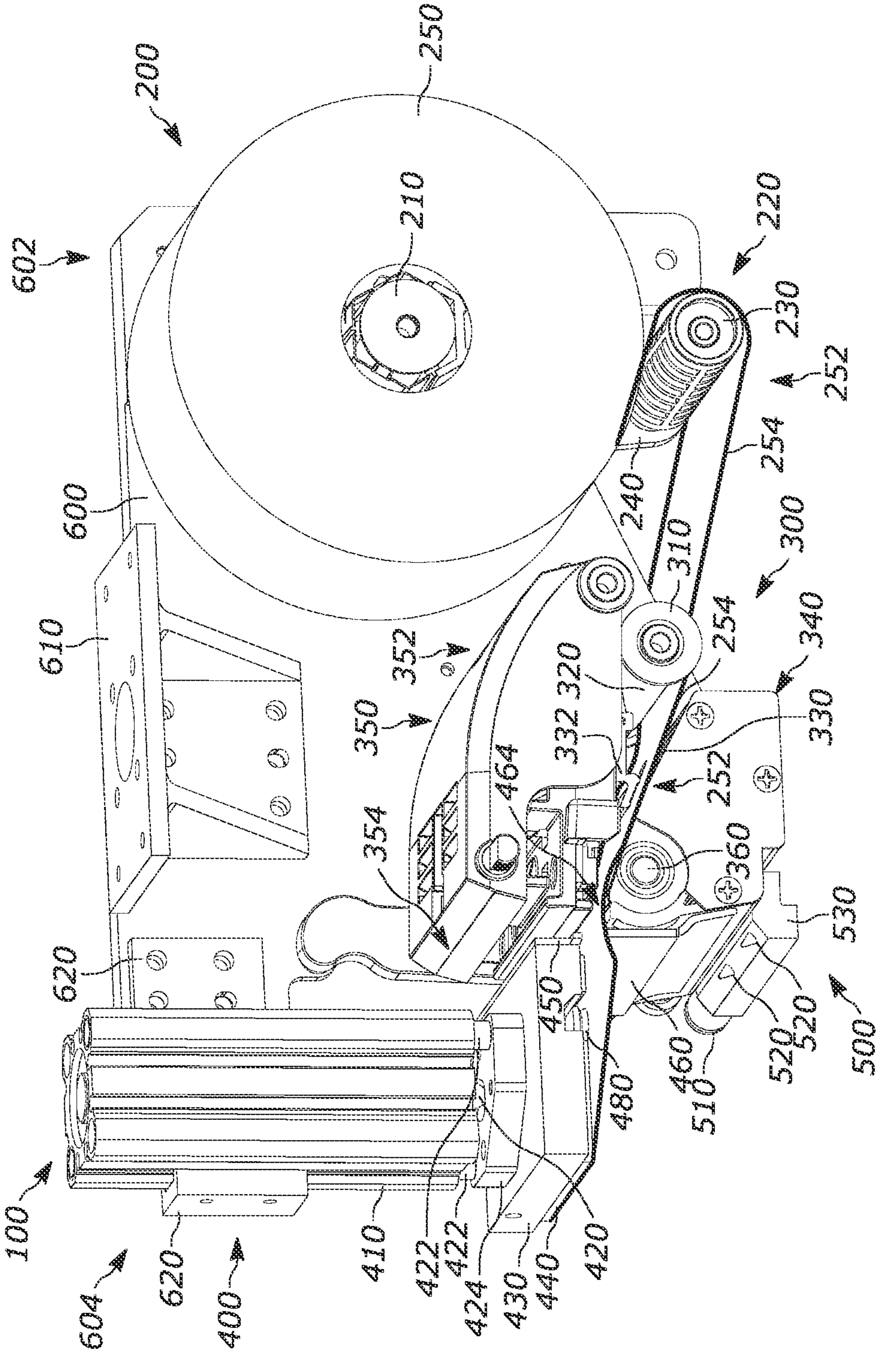
FIG. 2 is a perspective view of the label application device with a media roll loaded, according to at least one aspect of the present disclosure, according to at least one aspect of the present disclosure.
Figure 3:
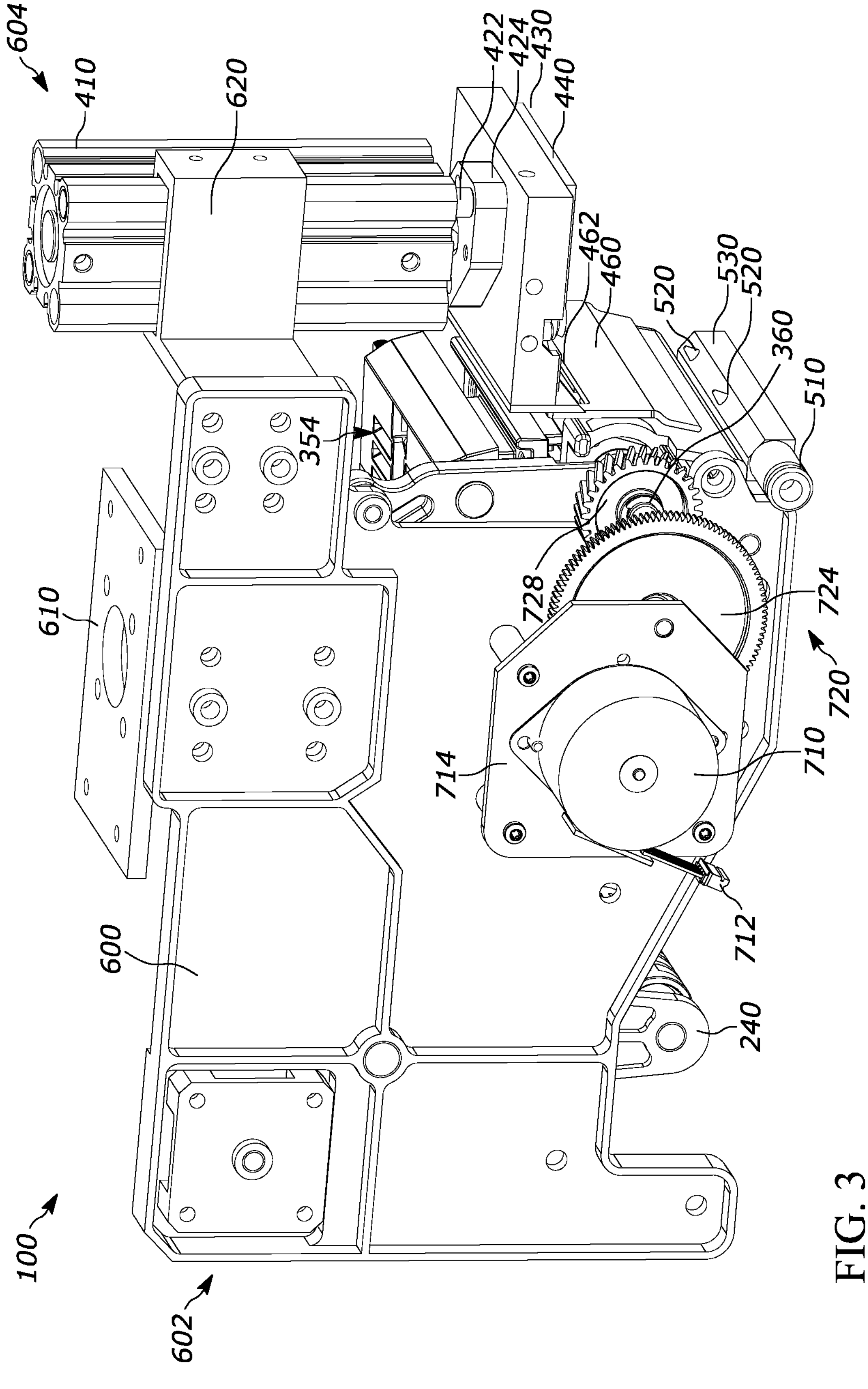
FIG. 3 is a perspective view of the label application device, according to at least one aspect of the present disclosure.
Figure 4:
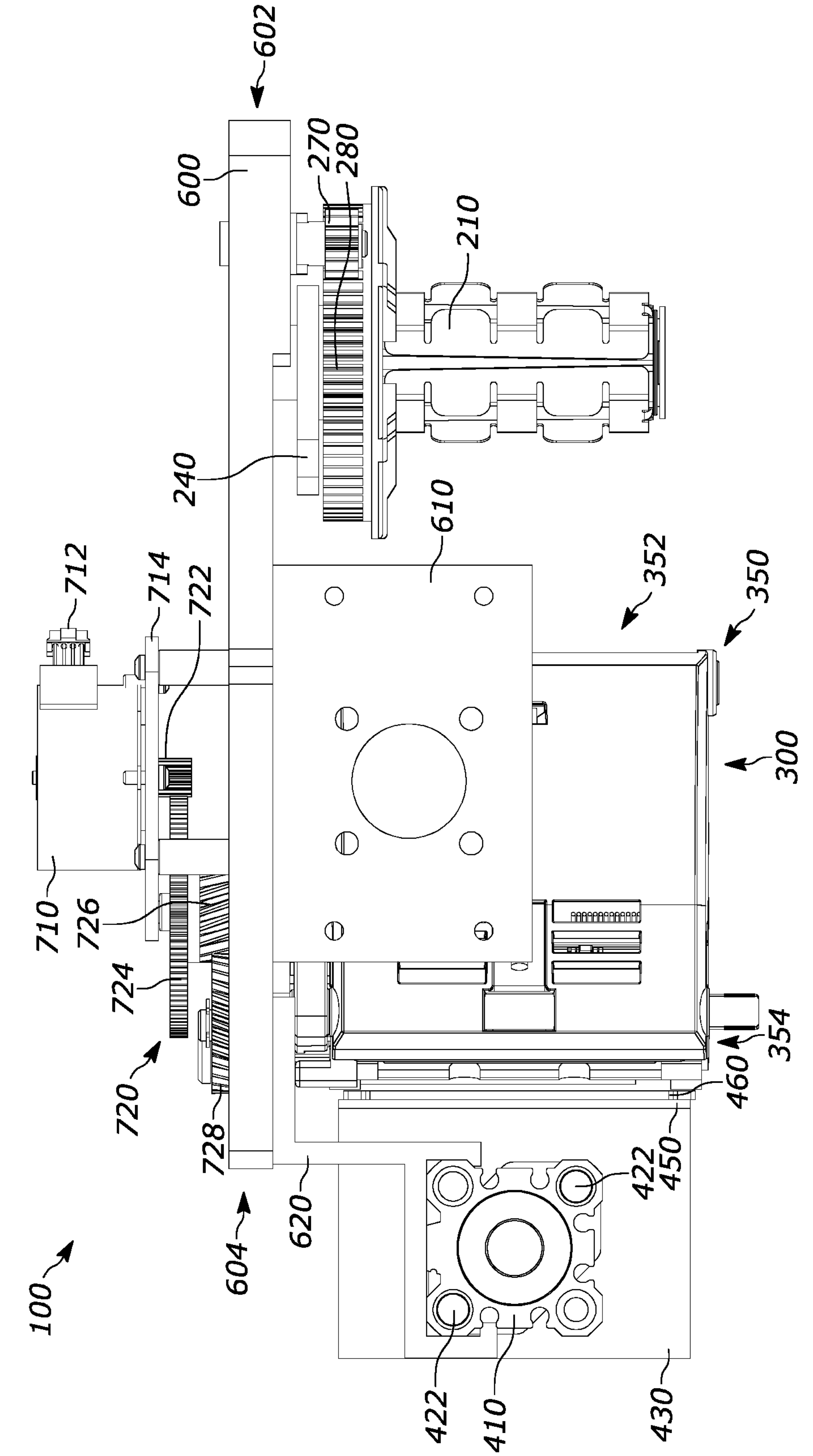
FIG. 4 is a top elevation view of the label application device, according to at least one aspect of the present disclosure.

FIGS. 1-8 describe one example of a label application device 100. FIG. 1 is a perspective view of the label application device 100, FIG. 2 is a perspective view of the label application device 100 with a media roll loaded, FIG. 3 is another perspective view of the label application device 100, and FIG. 4 is a top elevation view of the label applicator device 100, each according to at least one aspect of the present disclosure. In one aspect, the label application device 100 is attached to a device positioning system to move the label application device 100 to an object to apply a label. In another aspect, an object can be moved into position for the label application device 100 to apply a label.

Referring to FIG. 1, the label application device 100 includes a mounting plate 600, where the different mechanisms of the label application device 100 are attached to the mounting plate 600. A mounting bracket 610 is attached to the mounting plate 600. In one aspect, the mounting bracket 610 can be attached to a device positioning system to move the entire label application device 100. In another aspect, the mounting bracket 610 is used to attach the label application device in a stationary position for an object to be moved in range of the label application device 100.

Referring to FIGS. 1 and 2, the mounting plate 600 has a media supply system 200 attached on the mounting plate 600. In one aspect, the media supply system 200 is attached on an upstream end 602 of the mounting plate 600. The media supply system 200 has a media roll holder 210 that is configured to hold a media roll 250 (FIG. 2). The media roll 250 is made up of a media web 254 that is loaded in a roll. In one aspect, the media web 254 is linerless label material. In one aspect, the media web 254 contains RFID inlays. As shown in FIG. 2, the media path 252 is open on the side making it easier for a user to load a media roll 250 into the label application device 100.

The media supply mechanism has a biasing member 220 that is configured to apply pressure to a portion of the media roll 250 (FIG. 4). The biasing member 220 comprises a biasing arm 240 extending away from the center of the media roll holder 210. The biasing arm 240 ends in a roller 230. The biasing arm 240 is configured to keep the media roll 250 tight as labels are printed from the media roll 250. In one aspect, the biasing arm 240 is attached to a spring 260 that biases the biasing arm 240 to keep the media roll 250 tight by applying a tension to the media web 254 by rotating around the media roll holder 210 in response to slack forming in the media web 254 during operation.

Referring to FIG. 4, the media roll holder 210 is coupled to a first gear 280 such that the media roll holder 210 and the first gear 280 rotate together. The first gear 280 is in meshing engagement with a second gear 270. The second gear 270 rotates around a shaft that is attached to the mounting plate 600. The second gear 270 is configured to not allow the media roll holder 210 to freely rotate. In at least one aspect, the second gear 270 applies a constant friction drag to the media roll holder 210. For example, the media roll holder 210 has to overcome a force applied by the second gear 270 for the media roll 250 to rotate. This design keeps a loaded media roll 250 from accidentally unwinding during operation of the label application device 100.

The mounting plate 600 has a print mechanism 300 attached to the mounting plate 600 downstream of the media supply system 200. The print mechanism 300 has a print head assembly 350 located above a support member 340. The print head assembly 350 and the support member 340 are both attached to the mounting plate 600. The print head assembly 350 includes a print heat. In one aspect, the print head is located at a downstream end 354 of the print head assembly 350. The print head is configured to print a label on the media web 254 of the media roll 250. The print head assembly 350 is located above a roller 320, where the roller 320 is located below the upstream end 352 of the print head assembly 350 and upstream of the support member 340. The roller 320 rotates around a shaft that is attached to the mounting plate 600. A guide 310 is attached to the end of the roller 320. The guide 310 is configured to keep the media roll 250 on the roller 320 during operation of the label application device 100.

The support member 340 has a surface 330 that is configured to support the media roll 250, when the media roll 250 is loaded into the label application device 100. A label biasing member 332 is attached to the print head assembly 350 and extends between the print head assembly 350 and the surface 330. The label biasing member 332 is configured to bias the media roll 250 toward the surface 330.

A platen 360 is located below the downstream end 354 of the print head assembly 350 immediately opposite the print head. Referring to FIG. 4, when the media roll 250 is loaded into the label application device 100, media web 254 is placed along the media path 252. The media web 254 is placed under the biasing member 220, under the roller 320, and into the upstream end 352 of the print head assembly 350 between the print head assembly 350 and the surface 330 of the support member 340. When the media roll 250 is loaded into the label application device 100, the end of the media web 254 is located between the downstream end 354 of the print head assembly 350 and the platen 360. In one aspect, the end of the media web 254 is located between the print head and the platen 360. The print head assembly 350 and the platen 360 compress the media web 254 such that as the platen 360 rotates the platen 360 moves the media web 254 in an upstream or downstream direction. In one aspect, the platen 360 rotating clockwise moves the media web 254 in an upstream direction and the platen 360 rotating counter clockwise moves the media web 254 in a downstream direction. As media web 254 is moved in the downstream direction, the media roll 250 is rotated in a counter clockwise direction allowing more media web 254 to be pulled from the media roll 250. In at least one aspect, as media web 254 is moved in the downstream direction, the force holding the media roll 250 in place is overcome and the media roll 250 is rotated in a counter clockwise direction allowing more media web 254 to be pulled from the media roll 250.

Referring to FIGS. 3 and 4, a motor 710 is configured to rotate the platen 360. The motor 710 is connected to a controller of the label application device 100 through connector 712. The motor 710 is mounted to a plate 714 that is attached to mounting plate 600. The motor 710 is coupled to the platen 360 such that a movement of the motor 710 causes a rotation of the roller. This process can be done through a variety of methods. For example, as shown in FIGS. 3 and 4, the motor 710 is coupled to the platen 360 through a gear train 720. The gear train 720 has a first gear 722 coupled to a shaft of the motor 710. The first gear 722 is in meshing engagement with a second gear 724. The second gear 724 is coupled to a third gear 726, such that the second gear 724 and the third gear 726 rotate together. The third gear 726 is in meshing engagement with a fourth gear 728. The fourth gear 728 is coupled to the platen 360 such that the fourth gear 728 and the roller rotate together. The gear train 720 is one example of how to connect the platen 360 with the motor 710.

The motor 710 and the print head assembly 350 work in sync to print a label on the media web 254. The printed label on the media web 254 exits the print head assembly 350 at the downstream end 354. The platen 360 moves the media web 254 downstream through a gap 464 in a fixed cutting member 460. The fixed cutting member 460 is located downstream to the print head assembly 350. In one aspect, the fixed cutting member 460 is attached to the downstream side of the support member 340. In another aspect, the fixed cutting member 460 could be attached to the mounting plate 600. The media web 254 passes through the gap 464 and over the surface 462. The platen 360 moves the media web 254 downstream so that the printed label on the media web 254 is downstream of the fixed cutting member 460 as shown in FIG. 2. The printed label on the media web 254 is moved downstream to an applicator system 400.

The applicator system 400 is attached to the mounting plate 600. In one aspect, the applicator system 400 is attached to the downstream end 604 of the mounting plate 600. In at least one aspect, the applicator system 400 is attached to the mounting plate 600 by a bracket 620. The bracket 620 can be attached to a tamp arm housing 410 of the applicator system 400. The applicator system can include a tamp arm 420, guides 422, a tamp block 430, and a tamp pad 440. The applicator system 400 can move from a retracted position where the tamp arm 420 is located inside of the housing 410 to an extended position where the tamp arm 420 extends out of the housing 410 moving the tamp pad 440 toward an object. This process is explained in more detail in regard to FIGS. 12 to 18.

In at least one aspect, the tamp arm 420 can be moved in the housing 410 with hydraulics. In other aspects, a motor could be used to move the tamp arm 420. In the retracted position, the tamp arm 420 and the guides 422 are located in the housing 410 as shown in FIG. 4. The guides 422 can move freely in channels in the housing 410. The guides 422 are configured to keep the tamp arm 420 from becoming bent during operation of the label application device 100. The guides can also keep the tamp pad 440 from rotating about the tamp arm 420 during operation of the label application device 100. The tamp arm 420 and guides 422 are coupled to a support member 424. The support member 424 is coupled to the tamp block 430. The tamp pad 440 is attached to a bottom surface of the tamp block 430.

Figure 5:
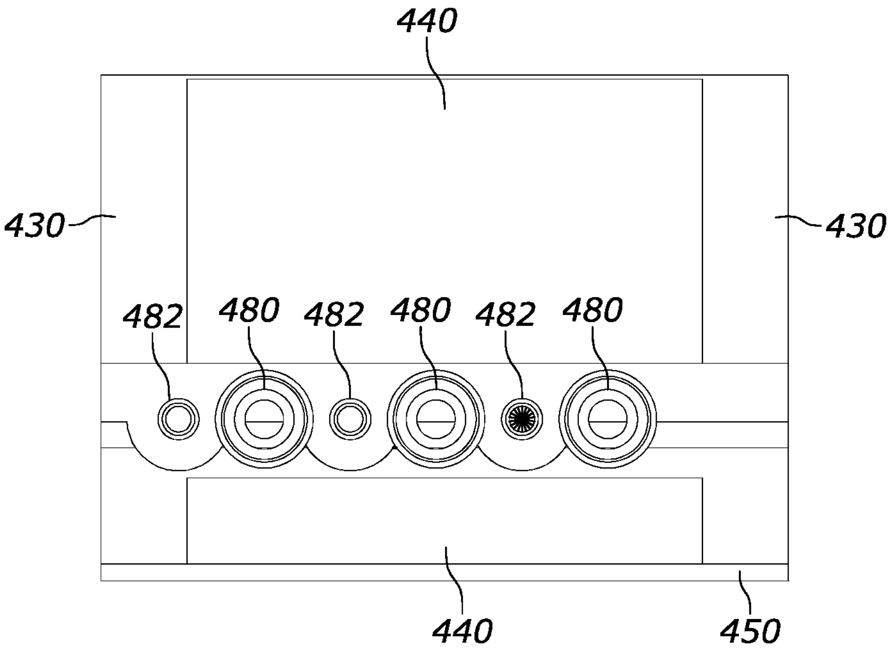
FIG. 5 is a bottom elevation view of an applicator system of the label application device, according to at least one aspect of the present disclosure.
Figure 6:
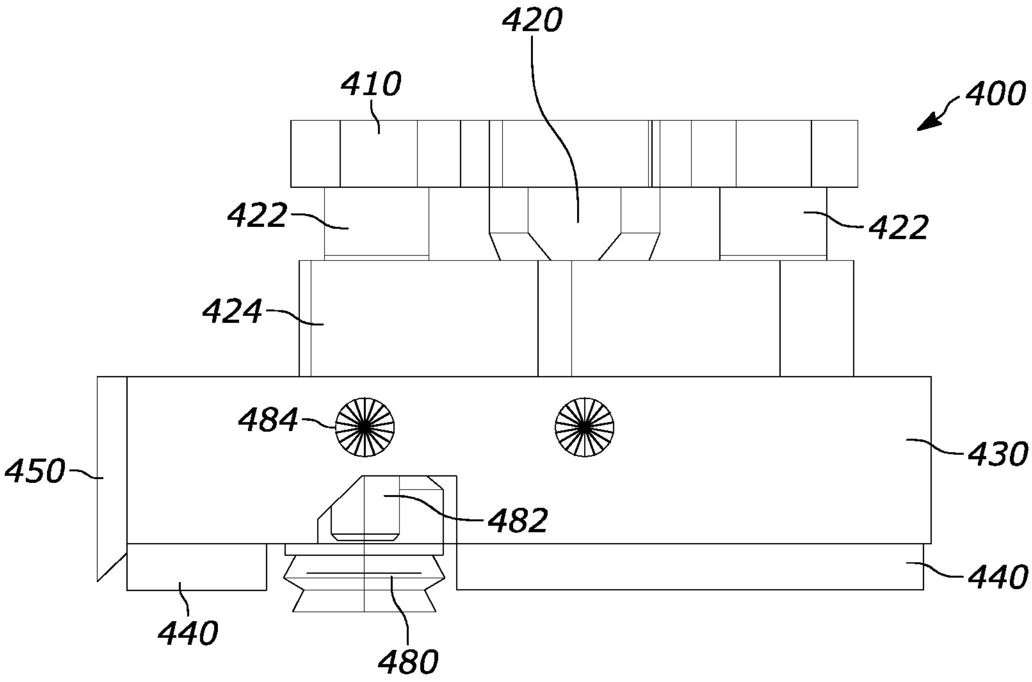
FIG. 6 is a side elevation view of the applicator system of the label application device, according to at least one aspect of the present disclosure.
Figure 7:
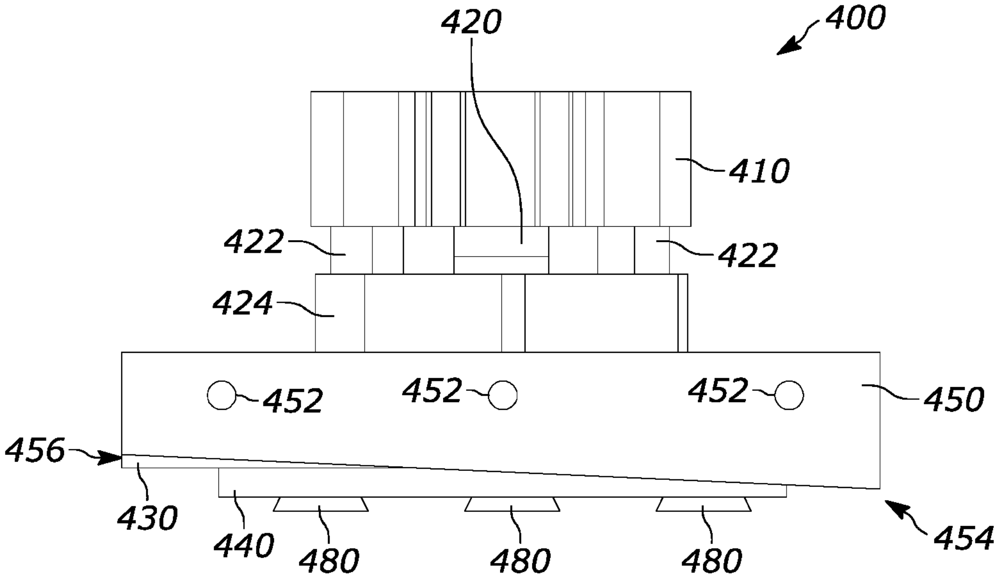
FIG. 7 is a front elevation view of the applicator system of the label application device, according to at least one aspect of the present disclosure.
Figure 8:
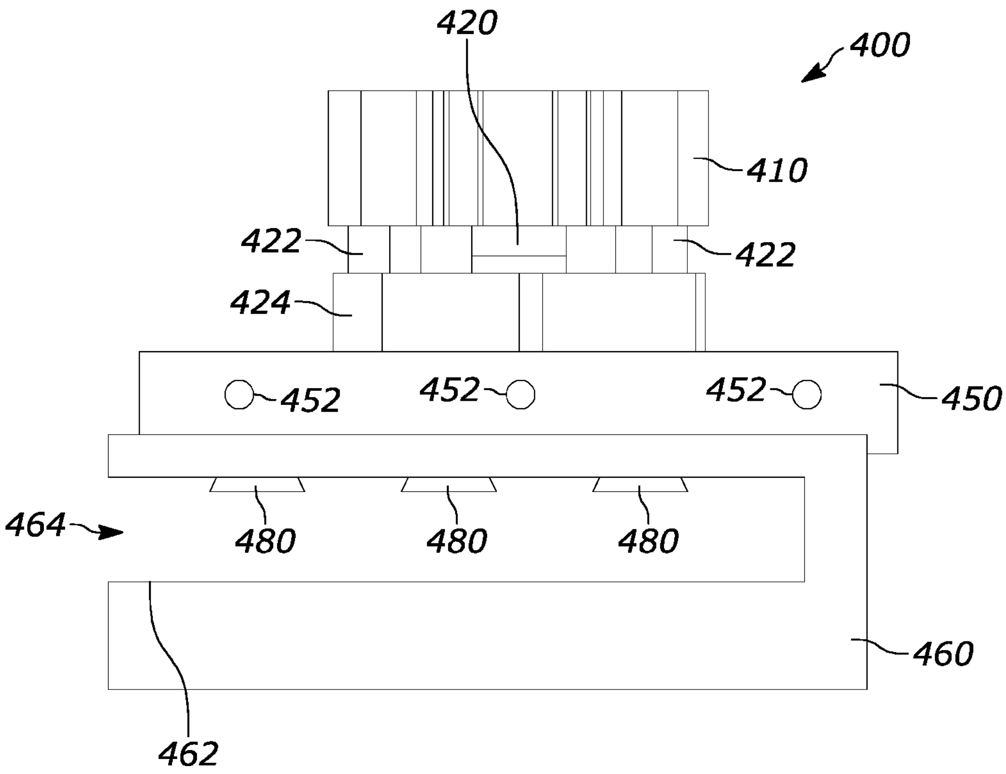
FIG. 8 is a front elevation view of the applicator system of the label application device showing a fixed cutting member, according to at least one aspect of the present disclosure.

FIGS. 5-8 illustrate different views of the applicator system 400. FIG. 5 is a bottom elevation view of the applicator system 400 of the label application device 100, FIG. 6 is a side elevation view of the applicator system 400 of the label application device 100, FIG. 7 is a front elevation view of the applicator system 400 of the label application device 100, and FIG. 8 is a front elevation view of the applicator system 400 of the label application device 100 showing the fixed cutting member 460, each according to at least one aspect of the present disclosure.

Referring to FIGS. 5 and 6, vacuum ports 480, 482 are located on the bottom of the tamp block 430. In one aspect, the vacuum ports 480 are larger than the vacuum ports 482. In at least one aspect, the vacuum ports 480, 482 are coupled inside of the tamp block 430 to the input port 484. The input port 484 is attached to a vacuum system that is configured to pull air into the vacuum ports 480, 482 or push air out of the vacuum ports 480, 482. For example, in a first state the vacuum system is configured to pull air into the vacuum ports 480, 482 and in a second state the vacuum system is configured to push air out of the vacuum ports. In at least one aspect, the vacuum system pulls air into the vacuum ports 480, 482 to suction media web 254 to the applicator system 400. In at least one aspect, the vacuum system pushes air out of the vacuum ports 480, 482 to decouple the media web 254 from the applicator system 400.

Referring to FIGS. 4, 6, and 7, a blade 450 is attached to an upstream side of the tamp block 430. In one aspect, the blade 450 can be directly attached to the tamp block 430. For example, the blade 450 can be screwed to the tamp block 430 with screws 452. In another aspect, the blade 450 can be attached to a blade holding mechanism that is attached to the tamp block 430. In at least one aspect, the blade holding mechanism is a quick release mechanism allowing a user to easily swap an old blade for a new one. For example, the blade holding mechanism could be a captive quarter-turn fastener or a lever release mechanism.

The blade 450 is attached to the tamp block 430 such that the blade does not extend below the tamp pad 440. When the applicator system 400 is applying a label to an object, the tamp pad 440 will come close to and/or touch the object, and the placement of the blade above the tamp pad 440 allows the blade 450 to not cut the object. The edge of the blade 450 is slanted from a first end 454 to a second end 456. This shape allows the blade 450 to easily cut the media web 254 as the tamp arm 420 moves from the retracted position to the extended position.

Referring to FIGS. 4 and 8, the media web 254 is moved downstream through the gap 464 along the surface 462 of the fixed cutting member 460. The platen 360 moves a printed label on the media web 254 to below the tamp pad 440 as shown in FIG. 4. The vacuum system pulls air into the vacuum ports 480, 482 to suction the printed label on the media web 254 against the tamp pad 440. The label application device 100 includes an air nozzle system 500 configured to direct air against the printed label on the media web 254. When the printed label on the media web 254 is first moved downstream it can flex down and be too far away for the vacuum ports 480, 482 to suction. The air blown from the air nozzle system lifts the printed label on the media web 254 toward the vacuum ports 480, 482 so that the vacuum ports can suction the printed label on the media web 254 against the tamp pad 440. The air nozzle system 500 includes an air manifold 530 where air nozzles 520 are attached. There can be any number of air nozzles 520 attached to the air manifold. The air manifold 530 further includes an input port 510 that is connected to an air supply. In at least one aspect, the air supply can be an air compressor.

The label application device 100 can be position so that it can apply a printed label to an object. A label is printed onto the media web 254 and the printed label on the media web 254 is moved downstream and suctioned against the tamp pad 440 by the vacuum ports 480, 482. Once the media web 254 is suctioned to the tamp pad 440, the tamp arm 420 begins moving from the retracted position to the extended position. For example, a sensor, e.g. a pressure sensor, could be used by a control circuit to determine when the media web 254 is suctioned to the tamp pad 440. Referring to FIGS. 4 and 8, during the movement of the tamp arm 420, the blade 450 moves down and cuts the media web 254 against the surface 462 of the fixed cutting member 460. For example, the vacuum ports 480, 482 hold the printed label against the tamp pad 440 and the printed label is cut from the media web 254 at the downstream edge of the surface 462. The tamp arm 420 continues moving to the extracted position and at the extracted position the printed label is applied to an object.

There are a variety of methods that can be used to apply the label to the object. In one aspect, the tamp pad 440 can be stopped close to the object without touching the object and the vacuum system can push air from the vacuum ports 480, 482 to force the printed label onto the object. In another aspect, the tamp pad 440 can touch the object and the vacuum system can stop pulling air into the vacuum ports 480, 482, or push air out of the vacuum ports 480, 482, before the tamp arm 420 moves to the retracted position.

Figure 9:
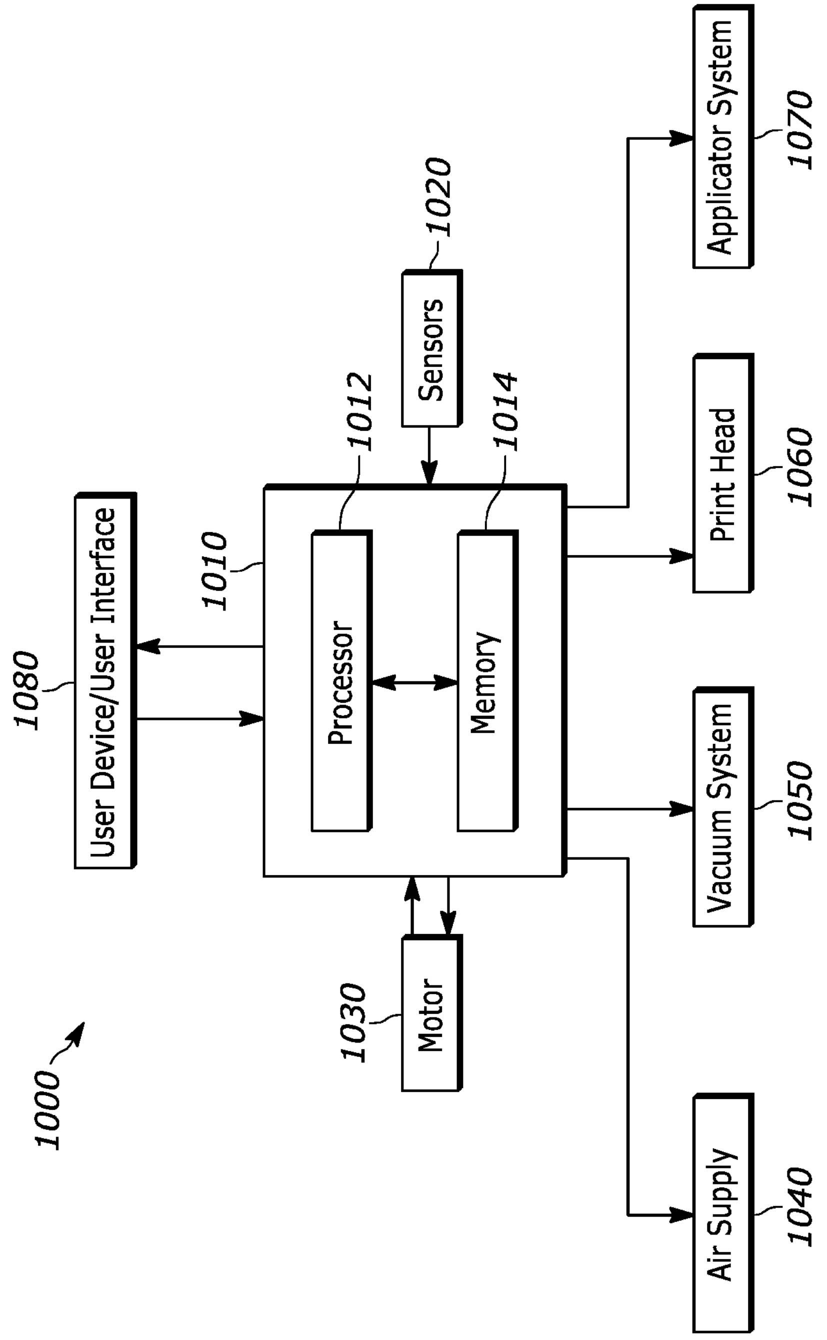
FIG. 9 is a diagram of a control system of the label application device, according to at least one aspect of the present disclosure.

FIG. 9 is a diagram 1000 of a control system of the label application device 100, according to at least one aspect of the present disclosure. The label application device 100 includes a control circuit 1010 that includes a processor 1012 coupled to a memory 1014. In at least one aspect, the control circuit 1010 can include multiple processors and/or memories. The diagram 1000 is showing the control system as only one control circuit 1010 for simplicity; however, the control circuit 1010 can be broken into multiple control circuits that communicate with each other and are coupled to the systems shown in the diagram 1000. The control circuit 1010 is coupled to sensors 1020 on the label application device 100. For example, a first pressure sensor could be located on the tamp pad 440, a second pressure sensor could be located inside of the vacuum port, an encoder sensor could be located on the motor, a position sensor configured to detect a position of the tamp arm 420 at any time, etc. The control circuit 1010 is coupled to a motor 1030 to control the movement of the media web 254. In one aspect, the motor 1030 is motor 710. In at least one aspect, the control circuit 1010 is coupled to an air supply 1040. For example, the control circuit 1010 can control a valve that allows air to flow out of the air nozzles 520. The control circuit 1010 is coupled to a vacuum system 1050. For example, the control circuit 1010 can cause the vacuum system 1050 to pull air into or push air out of the vacuum ports 480, 482. In at least one aspect, the control circuit 1010 can control the vacuum system 1050 based on data received by sensors 1020. The control circuit 1010 is coupled to the print head 1060. For example, the control circuit 1010 can cause the print head 1060 to print a label based on label data supplied to the print head 1060 by the control circuit 1010.

The control circuit 1010 can receive the label data from a user device 1080, or user interface. In one aspect, a user device can send a list of labels that correspond to objects that will be moving by the label application device 100 on a conveyor. This process can allow the label application device 100 to apply a different label to each object as it passes the label application device 100. In another aspect, the label application device 100 can be configured to apply the same label to each object through a user device 1080.

The control circuit 1010 is coupled to the applicator system 1070. The control circuit 1010 can control the applicator system 1070 to apply a label to an object at the appropriate time. In at least one aspect, the applicator system 1070 is applicator system 400. For example, in this aspect, the control circuit 1010 can control the applicator system 400 to control the movement of the tamp arm 420. For example, if the tamp arm 420 moves based on hydraulics, then the control circuit 1010 would control the hydraulic system to move the tamp arm 420.

Figure 10:
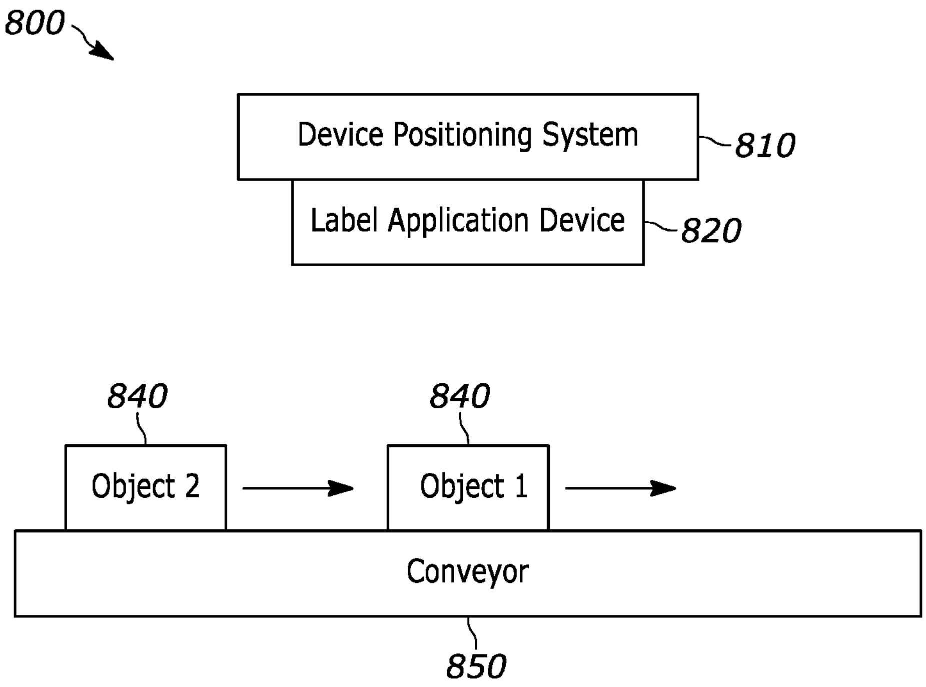
FIG. 10 is a diagram of the label application device, according to at least one aspect of the present disclosure.

FIG. 10 is a diagram 800 of a label application device 820 being positioned relative to an object 840, according to at least one aspect of the present disclosure. The label application device 820 is substantially similar to label application device 100. The label application device 820 can be attached to a device positioning system 810. The objects 840 can be moved on a conveyor 850 past the label application device 820 and device positioning system 810. For example, the object 840 could move on a conveyor 850 within the range of the device positioning system 810. In one aspect, the device positioning system 810 can move the label application device 820 relative to an object 840 so that the label application device 820 can place a printed label on an object 840. In at least one aspect, the device positioning system 810 is a robotic arm. In another aspect, the device positioning system 810 can be stationary and keep the label application device 820 in one location. For example, the objects 840 could move on a conveyor 850 directly under the label application device 820.

In one aspect, the device positioning system 810 determines when an object 840 is in position to receive a printed label, and informs the label application device 820 to place the printed label on the object 840. In another aspect, the label application device 820 determines when an object is in the proper position to receive a printed label. For example, a control circuit, e.g. control circuit 1010, can receive image data of an object relative to the label application device 820 from a camera and the control circuit can perform image analysis of the image data to determine when the object is in position to receive a printed label.

Figure 11:
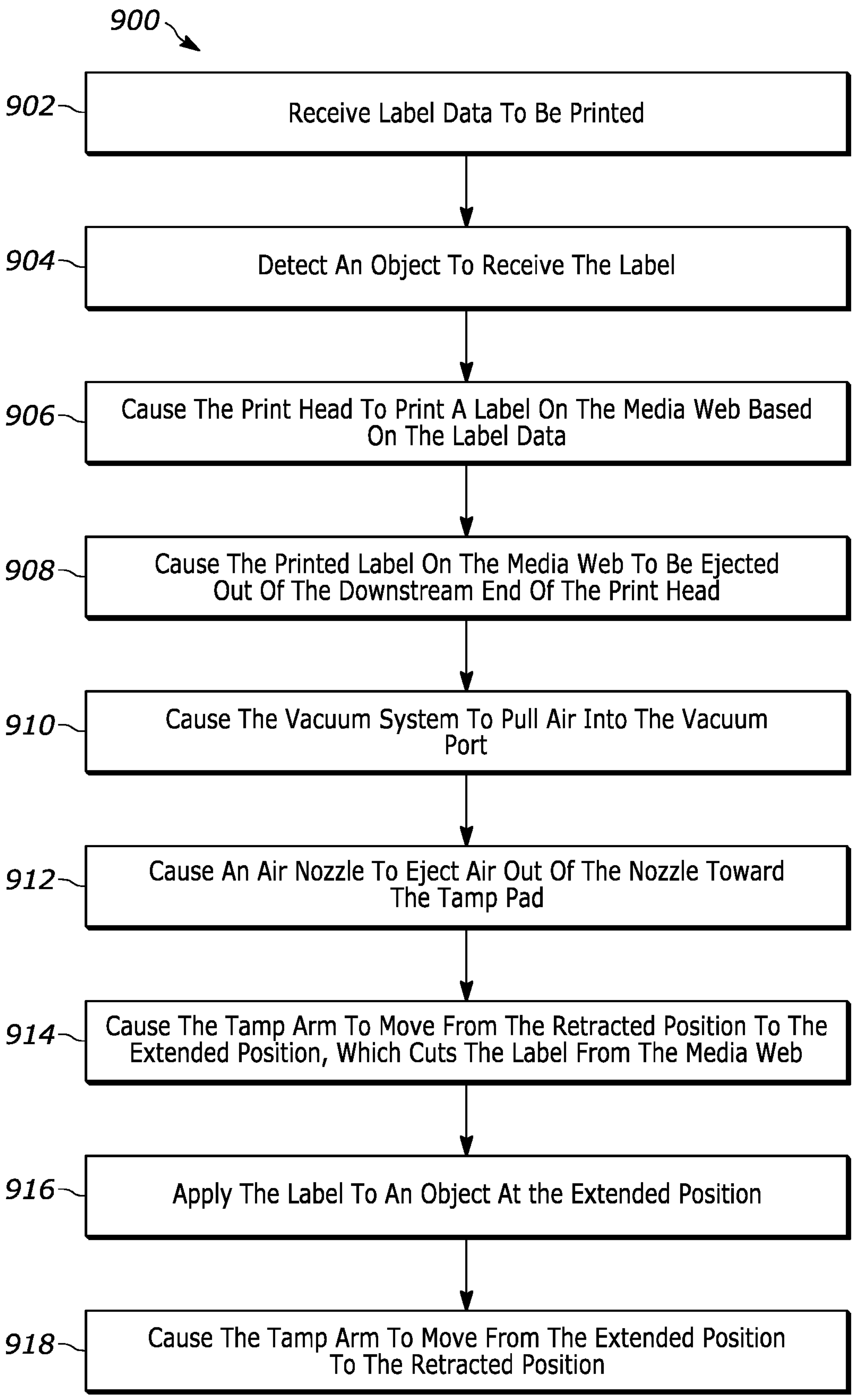
FIG. 11 is a flow diagram illustrating a method that can be executed by a control circuit to control the label application device, according to at least one aspect of the present disclosure.
Figure 12:
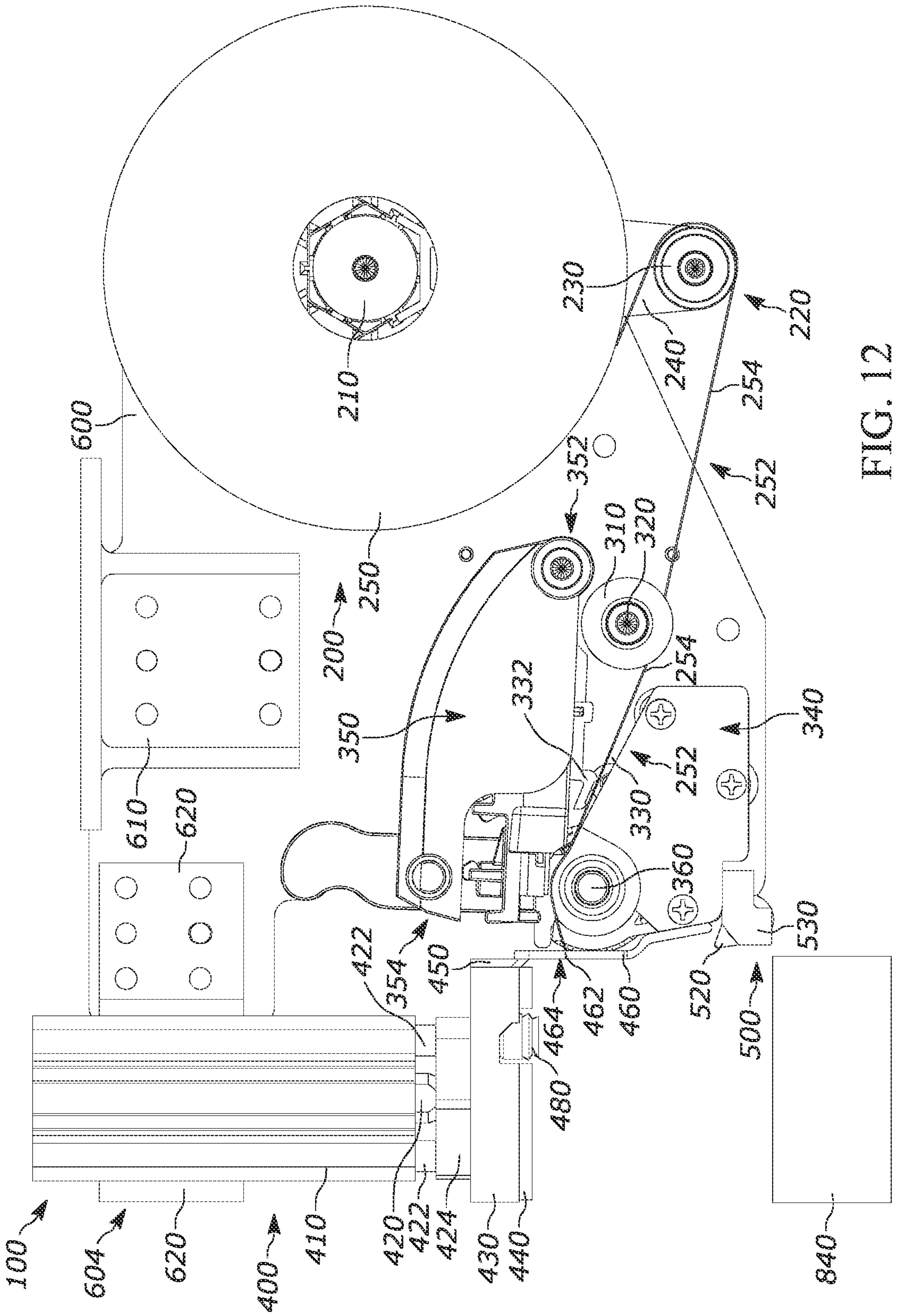
FIG. 12 is a side elevation view of the label application device with a media roll loaded, according to at least one aspect of the present disclosure.

In at least one aspect, FIG. 11 is a flow diagram illustrating a method 900 that can be executed by a control circuit, e.g. control circuit 1010, to control the label application device 100, according to at least one aspect of the present disclosure. FIGS. 12-18 illustrate the different actions of the label application device 100 as the method 900 is executed. FIG. 12 is a side elevation view of the label application device 100 with a media roll 250 loaded, according to at least one aspect of the present disclosure. Before the label application device 100 can begin applying printed labels, a media roll 250 has to be loaded into the machine. When the media roll 250 in loaded, the media web 254 ends just past the platen 360. At this point the label application device 100 is ready to begin applying labels.

Referring to FIG. 11, the method 900 includes receiving 902 label data to be printed. The method 900 further includes detecting 904 an object 840 to receive a label. In one aspect, image data captured by a camera mounted on the label application device 100 is used to detect an object 840 to receive a label. The method 900 further includes causing 906 the print head assembly 350 to print a label on the media web 254 based on the label data. The method further includes causing 908 the printed label on the media web 254 to be ejected out of the downstream end 354 of the print head assembly 350.

Figure 13:
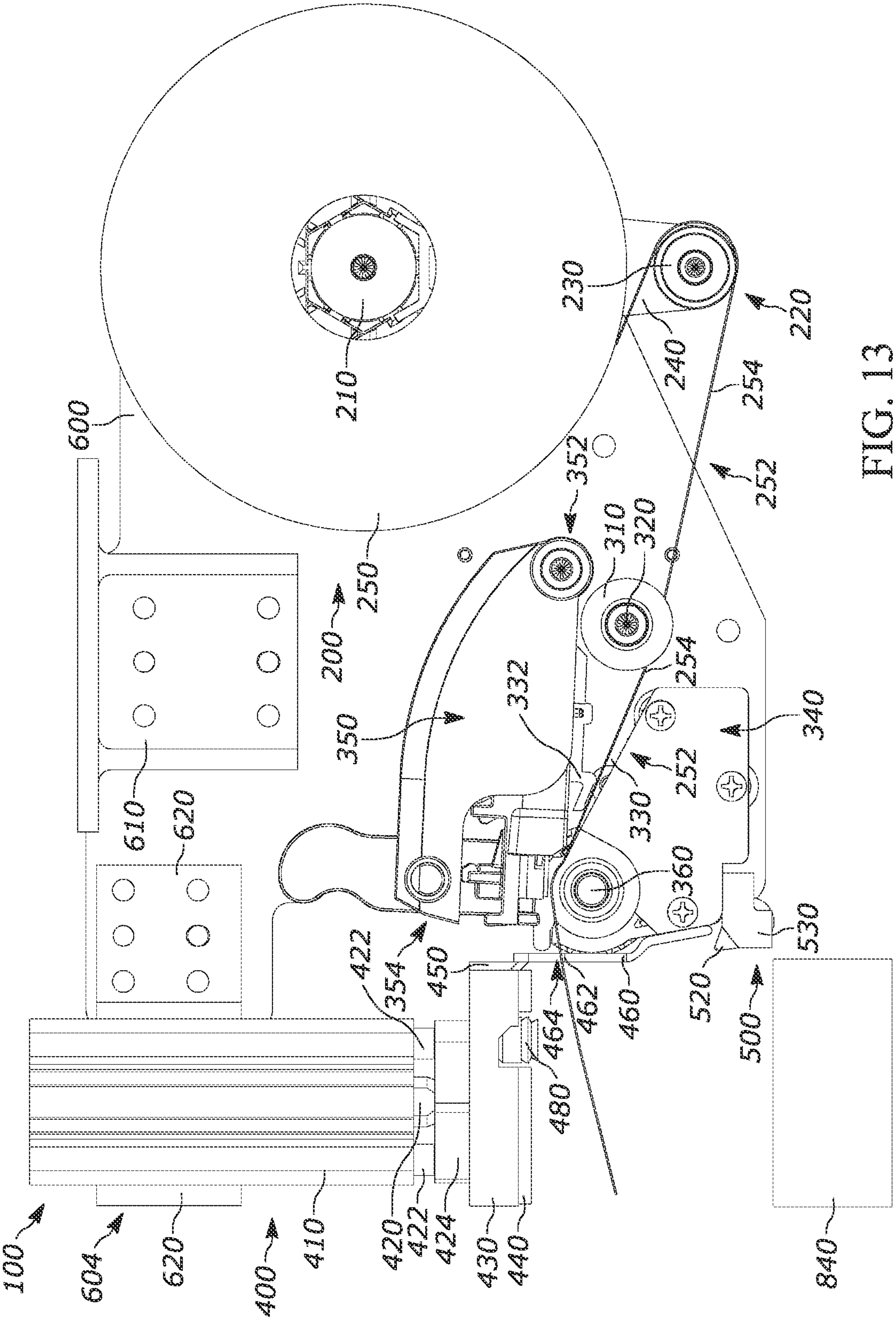
FIG. 13 is a side elevation view of the label application device with a label printed on the media roll, according to at least one aspect of the present disclosure.

FIG. 13 is a side elevation view of the label application device 100 with a label printed on the media roll 250, according to at least one aspect of the present disclosure. The printed label on the media web 254 was moved downstream through the gap 464 in the fixed cutting member 460. The printed label on the media web 254 is moved downstream until it is completely below the tamp pad 440. As shown, in FIG. 13, the downstream end of the media web 254 tends to bend down away from the tamp pad 440.

Referring back to FIG. 11, the method 900 further includes causing 910 the vacuum system to pull air into the vacuum ports 480, 482. The goal of pulling the air into the vacuum ports 480, 482 is to suction the media web 254 with the printed label onto the tamp pad 440. In one aspect, the media web 254 is close enough for the vacuum ports 480, 482 to suction the media web 254 against the tamp pad 440. In another aspect, the media web 254 is bent too far away for the vacuum ports 480, 482 to suction the media web 254 against the tamp pad 440. The method 900 further includes causing 912 the air nozzles 520 to eject air out of the air nozzles 520 toward the tamp pad 440. The air out of the air nozzles 520 pushes against the media web 254. In the aspect of the media web 254 bending away from the tamp pad 440, the air from the air nozzle lifts the media web 254 toward the tamp pad 440 for the vacuum ports 480, 482 to suction the media web 254 against the tamp pad 440.

Figure 14:
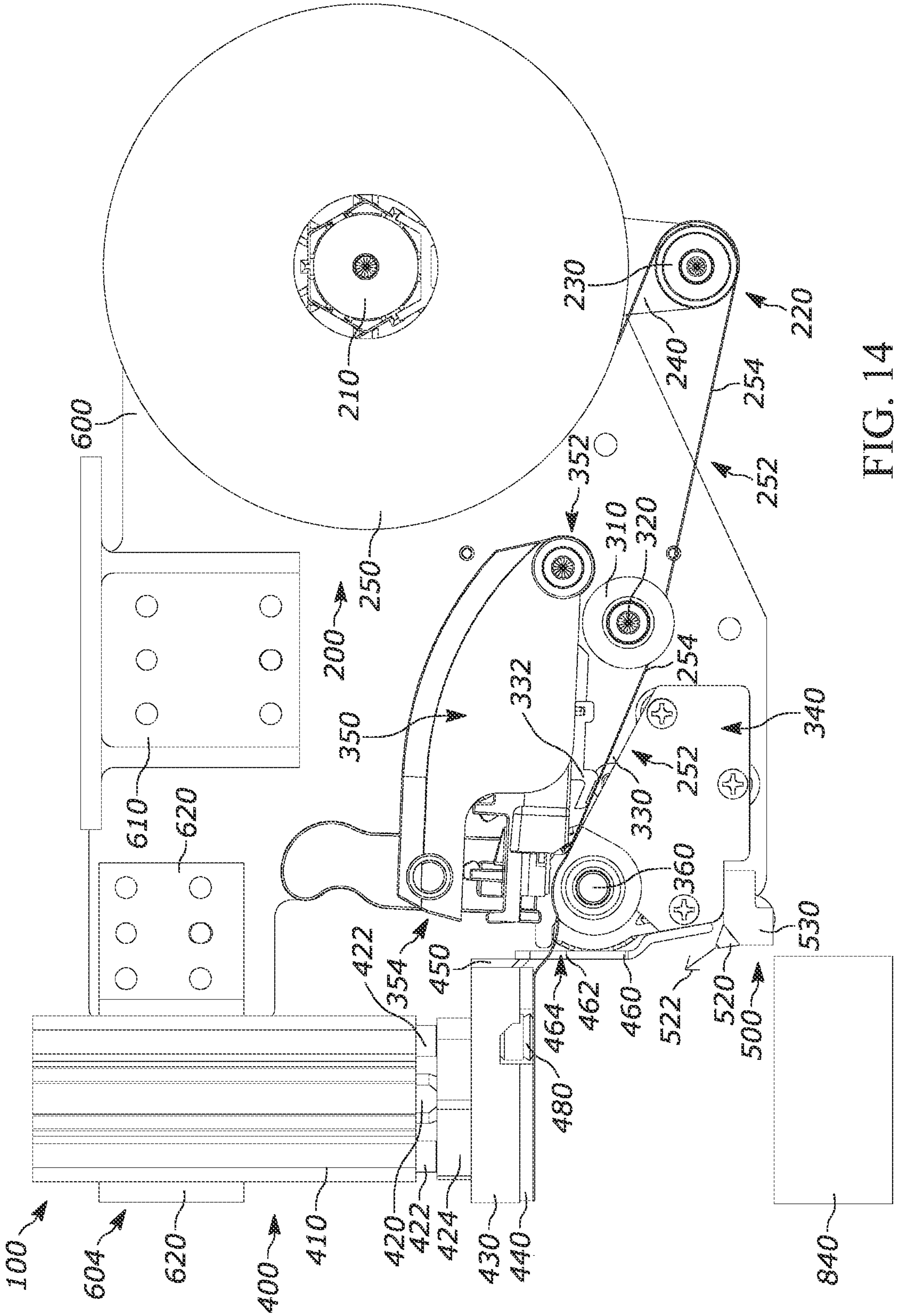
FIG. 14 is a side elevation view of the label application device with the printed label coupled to the tamp arm pad, according to at least one aspect of the present disclosure.

FIG. 14 is a side elevation view of the label application device with the printed label coupled to the tamp arm pad, according to at least one aspect of the present disclosure. The air nozzles 520 have air coming out of the air nozzles in the direction 522 toward the tamp pad 440. In at least one aspect, the air from the air nozzles 520 allows the vacuum ports 480, 482 to suction the media web 254 against the tamp pad 440. In at least one aspect, the air from the air nozzles 520 can keep the media web 254 from curling at the downstream end.

Figure 15:
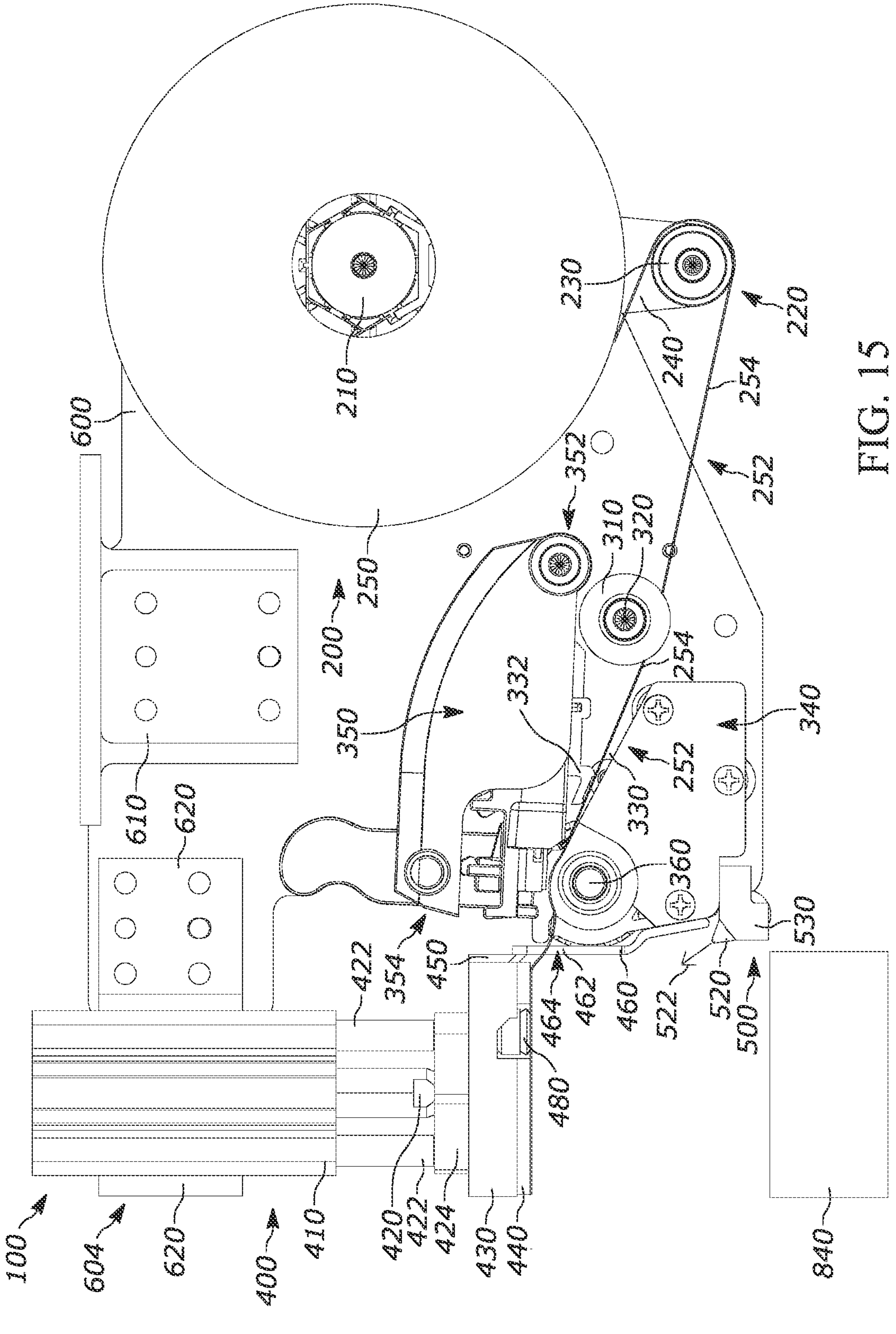
FIG. 15 is a side elevation view of the label application device with the tamp arm extending to cut the media roll, according to at least one aspect of the present disclosure.
Figure 16:
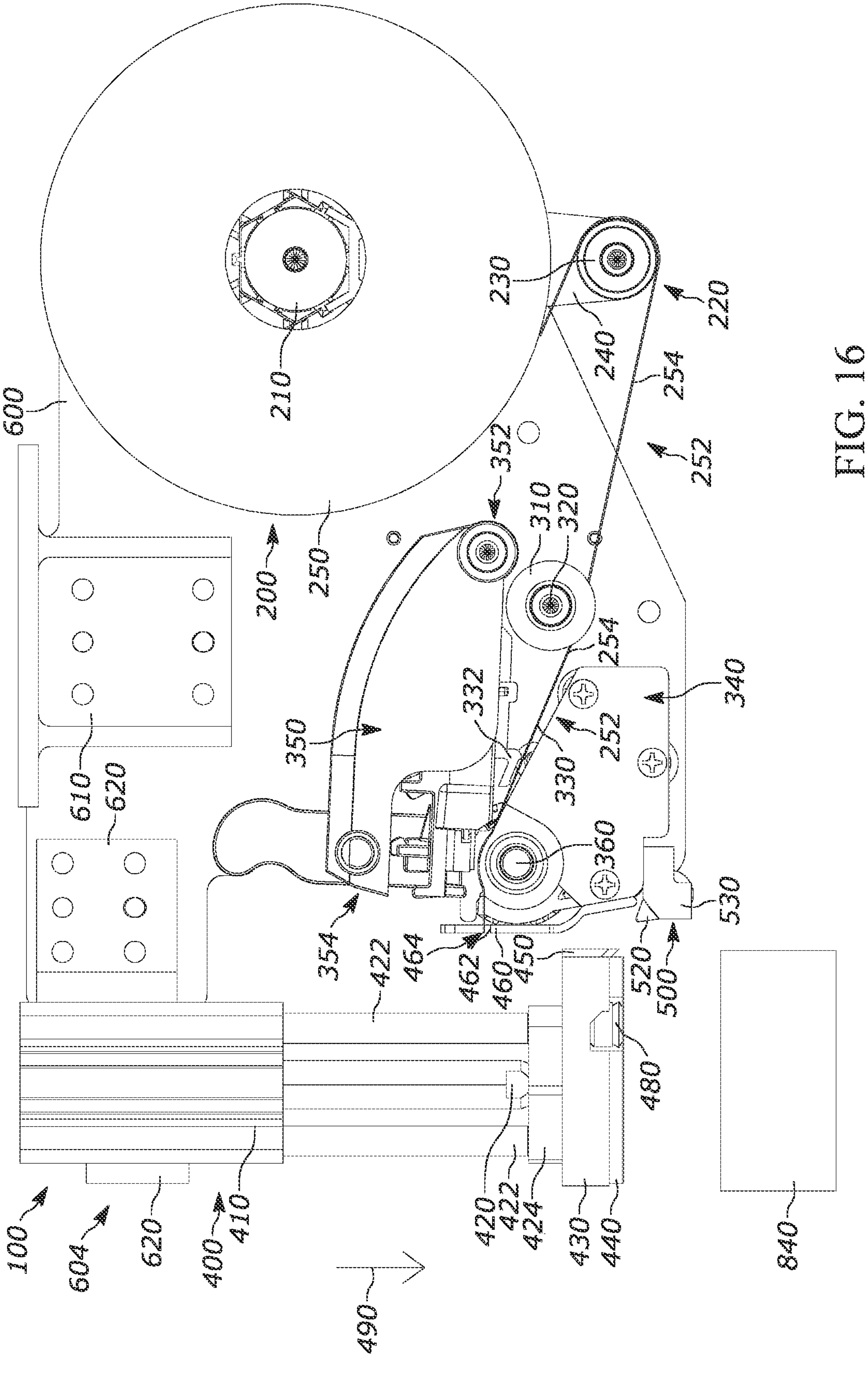
FIG. 16 is a side elevation view of the label application device with the printed label cut from the media roll, according to at least one aspect of the present disclosure.

Referring back to FIG. 11, the method 900 further includes causing the tamp arm 420 to move from the retracted position to the extended position, which cuts the printed label from the media web 254. FIGS. 15 and 16 show this process. FIG. 15 is a side elevation view of the label application device with the tamp arm extending to cut the media roll 250 and FIG. 16 is a side elevation view of the label application device with the printed label cut from the media roll 250, each according to at least one aspect of the present disclosure. The tamp arm 420 moves in the direction 490 to move from the retracted position to the extended position. During the tamp arm 420 movement, the blade 450 moves down past the gap 464 and surface 462. As the blade 450 moves past the surface 462 it cuts the media web 254 between the blade 450 and the edge of the surface 462. The printed label 256 is then cut from the media web 254. The end of the media web 254 is then located at the end of the surface 462. The printed label 256 is coupled to the tamp pad 440 and being moved toward the object 840. In at least one aspect, as the tamp arm 420 moves to the extended position, the air stops blowing from the air nozzle.

Figure 17:
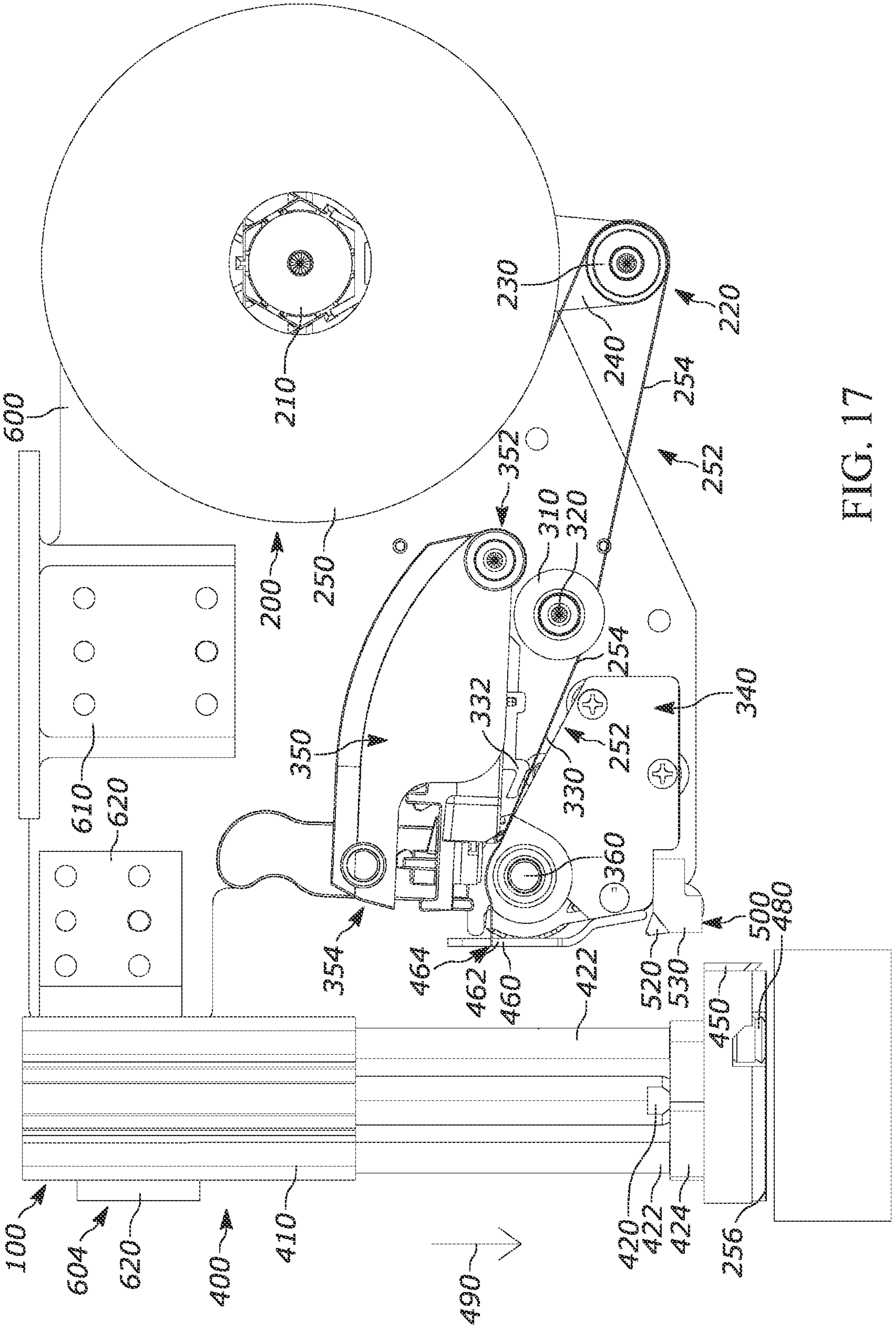
FIG. 17 is a side elevation view of the label application device with a tamp arm extended to apply a label to an object, according to at least one aspect of the present disclosure.

Referring to FIG. 11, the method 900 further includes applying 916 the printed label 256 to the object 840 at the extended position. FIG. 17 is a side elevation view of the label application device 100 with the tamp arm 420 extended to apply a label 256 to the object 840, according to at least one aspect of the present disclosure. In one aspect, the tamp pad 440 touches the object 840 to apply the label 256. In another aspect, the tamp pad stops close to the object 840 and does not touch the object and the vacuum system pushes air out of the vacuum ports 480, 482 to blow the label 256 against the object 840. Prior to the tamp arm 420 retracting, the vacuum system stops pulling or pushing air out of the vacuum ports 480, 482.

Figure 18:
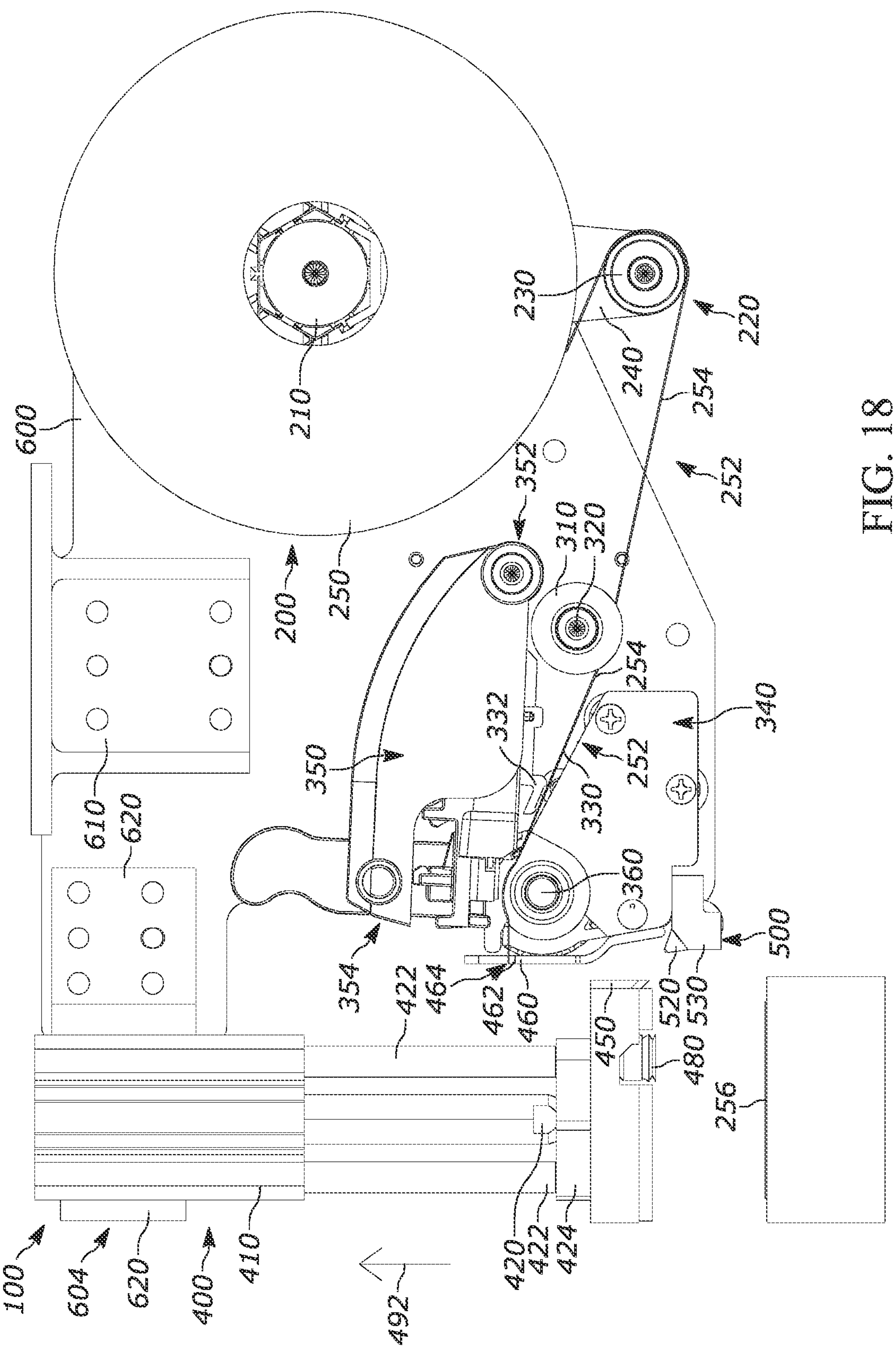
FIG. 18 is a side elevation view of the label application device with a label applied to an object and the tamp arm retracting, according to at least one aspect of the present disclosure.

Referring to FIG. 11, the method 900 further includes causing 918 the tamp arm 420 to move from the extended position to the retracted position. FIG. 18 is a side elevation view of the label application device 100 with a label 256 applied to an object 840 and the tamp arm 420 retracting, according to at least one aspect of the present disclosure. After the label 256 is applied to the object 840, the tamp arm 420 moves in the direction 492 to move the tamp arm 420 to the retracted position. The object 840 can then be moved so that the next object can have a label applied. In at least one aspect, the objects are moved on a conveyor.

In the foregoing detailed description, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the terms "component," "system," "module" and the like can refer to a computer-related entity, either hardware, a combination of hardware and software, software, or software in execution.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A label application device for applying a label to an object, the label application device comprising:

a media roll holder configured to secure a media roll;

a tamp arm configured to move from a retracted position to an extended position; and a print head located between the media roll holder and the tamp arm, wherein the print head is configured to receive the media roll on an upstream end of the print head, feed the media roll into the print head, and eject the media roll out of a downstream end of the print head, and wherein the tamp arm comprises:

a tamp pad attached to an end of the tamp arm, wherein the tamp pad comprises a vacuum port on a surface of the tamp pad, and wherein the vacuum port is configured to suction the media roll against the surface of the tamp pad; and a blade attached to an upstream side of the tamp arm, wherein the blade is configured to cut the media roll as the tamp arm moves from the retracted position to the extended position.

2. The label application device of claim 1, wherein the blade is replaceable.

3. The label application device of claim 1, further comprising a control circuit configured to:

receive label data to be printed;

cause the print head to print a label onto the media roll based on the label data, wherein the printed label on the media roll is ejected out of the downstream end of the print head;

cause the vacuum port to couple to the printed label;

cause the tamp arm to move from the retracted position to the extended position, wherein the printed label is cut from the media roll as the tamp arm moves from the retracted position to the extended position; and cause the tamp arm to apply the label to the object at the extended position.

4. The label application device of claim 3, wherein the label application device further comprises an air nozzle configured to direct air toward the surface of the tamp pad.

5. The label application device of claim 4, wherein the control circuit is further configured to cause air to begin blowing out of the air nozzle toward the tamp pad in response to the print head ejecting a printed label.

6. The label application device of claim 5, wherein the air pushes the printed label toward the surface of the tamp pad.

7. The label application device of claim 3, wherein the control circuit is further configured to cause the vacuum port to blow air out of the vacuum port to decouple the printed label from the surface of the tamp pad.

8. The label application device of claim 1, wherein the label application device further comprises a biasing member configured to apply tension to the media roll.

9. The label application device of claim 8, wherein the positioning system is a robotic arm.

10. The label application device of claim 1, wherein the label application device is attached to a positioning system, and wherein the positioning system is configured to position the label application device relative to the object.

11. The label application device of claim 1, further comprising a fixed cutting surface extending downstream from the downstream end of the print head to the blade, wherein the media roll rests against the fixed cutting surface, and wherein the blade moves past the fixed cutting surface to cut the media roll.

* * * * *